UNITED STATES PATENT OFFICE.

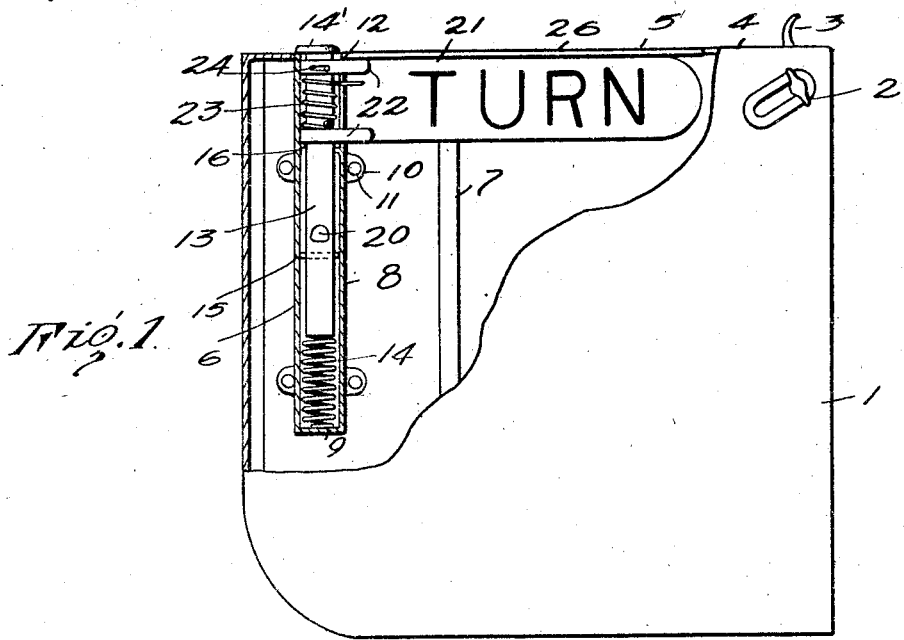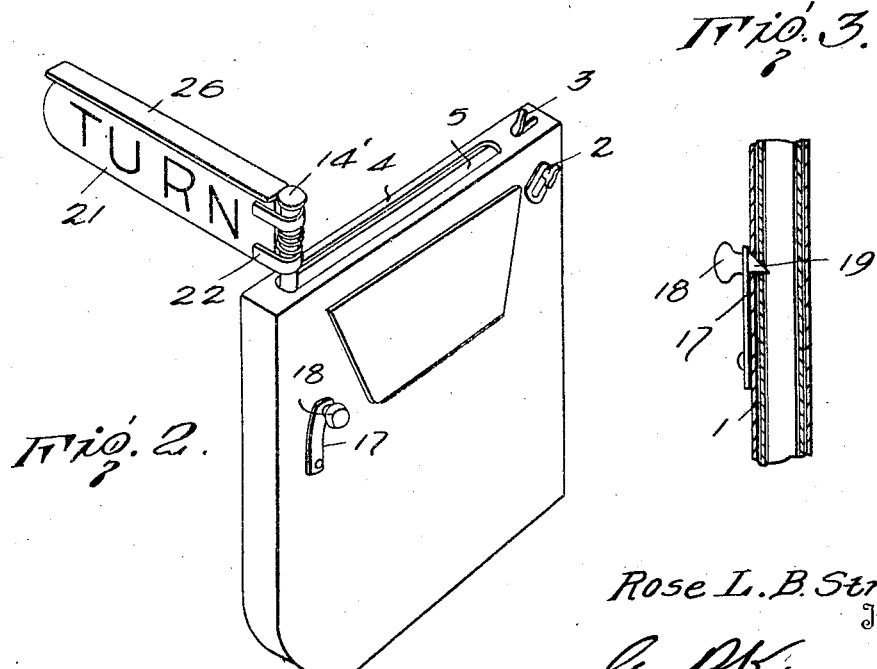

ROSE L. B. STRUBLE, OF PENN YAN, NEW YORK.

AUTOMOBILE-SIGNAL.

1,244,560.     Specification of Letters Patent.     Patented Oct. 30, 1917.

Application filed March 12, 1917. Serial No. 154,253.

*To all whom it may concern:*

Be it known that I, ROSE L. B. STRUBLE, a citizen of the United States, and resident of Penn Yan, in the county of Yates and State of New York, have invented certain new and useful Improvements in Automobile-Signals, of which the following is a specification.

This invention relates to new and useful improvements in automobile signals, and the primary object of the invention is to provide an automobile signal that is adapted to be secured to the automobile parallel with one side thereof, and adjacent the operator's seat, and provided with means whereby the signal is adapted to swing outwardly when the automobile is about to make a turn. This signal is manually controlled, but automatically operated, and obviates the necessity of the operator of the machine taking one hand from the steering wheel to signal when the automobile is being turned as has been heretofore necessary.

Another object of the invention is to provide an automobile signal of this character which is adapted to be positioned in the door of the automobile adjacent the operator's seat, and which is normally disposed within said door, the said signal being manually controlled whereby when released it is adapted to move upwardly through the top of the door, and to swing outwardly at right angles to the automobile.

Another object of the invention is to provide a device of this character which is applicable to various types of automobiles, the same being so constructed that it is secured to the door of the automobile with practically little or no change to the construction thereof.

A still furth.. object of the invention is to provide a device of this character which is easily and simply constructed, inexpensive to manufacture, and one which will be very efficient in operation.

With these and numerous other objects in view my invention consists of the novel features of construction, combination and arrangement of parts which will be hereinafter referred to and more particularly pointed out in the specification and claims.

In the accompanying drawing:

Figure 1 is a side elevational view of an automobile door, showing one side thereof partly broken away, to illustrate the application of my signal thereto;

Fig. 2 is a perspective view of the door showing the signal in operative position, and Fig. 3 is a vertical section through the casing in which the rod to which the signal is secured is positioned, showing the latch means for controlling the same.

In describing my invention I shall refer to the drawing in which similar reference characters designate corresponding parts throughout the several views. The numeral 1 designates an automobile door of the conventional type which is provided with the usual type of latch or lock 2, and handle 3 on the upper edge thereof. The upper edge 4 of the door has formed therein a longitudinally extending slot 5, that has positioned adjacent one end a socket 6. The socket 6 is positioned adjacent the hinged end of the door 1, so that it is nearest to the operator's seat of the automobile. In the type of automobile door shown in the accompanying drawing the same is provided with side walls, connected by a partition 7, but in some types where the door is solid the slot or recess 5, and the socket 6 will be formed therein.

The socket 6 in the type of door shown in the accompanying drawing is formed by a tubular casing 8 having its lower end 9 closed, while its upper end is connected with the recess 5 in the upper edge of the door. The casing 8 is provided with laterally projecting ears 10, by means of which the same is secured by fastening members 11 to one of the side walls of the automobile door. It is obvious that where the socket is formed within the door, these ears may be done away with, and the casing formed with a smooth outer wall that is positioned directly within the door. The casing 8 has formed adjacent its open end a longitudinally extending notch 12 that communicates with the recessed portion 5 that extends longitudinally along the upper edge of the door.

Slidably mounted within the casing 8 and adapted to move vertically with respect to the same is a rod 13, that has interposed between its lower end and the closed end of the casing a coiled spring 14, that normally holds the said rod under a constant tension, when the rod is entirely disposed within the casing. The rod is provided with a head portion 14′ on its upper end that is normally positioned in alinement with the upper edge of the door when said rod is positioned in the casing as clearly shown in Fig. 1 of the drawing. The rod 13 has a pin extending therethrough, its projecting ends 15 coacting with an annular ring 16 formed on the inner wall thereof adjacent the lower end of the slot 12, to limit the sliding movement of the rod within the casing. A latch 17 that is formed from a piece of spring metal is secured at one end to the inner side of the door, while a knob or handle 18 is fastened on its opposite end. The free end of the latch is provided with a projecting portion 19, that extends through an opening in said side of the door, and casing and is adapted for positioning in a recess 20 within the wall of the rod 13, when the rod is positioned within said casing.

The signal proper of this device comprises a flat strip 21 that is preferably formed of some light metal for instance aluminum, and which is painted, preferably with the word "Turn" thereon to designate that the automobile is about to be turned when the signal is in operative position. This signal is preferably painted with phosphorescent paint so that the same will be visible at night. The signal 21 is disposed vertically within the recess 5 in the upper edge of the casing through the longitudinally extending slot, and the same has its inner end connected by a pair of hinge members 22 with the upper end of the rod 13. A coiled spring 23 is associated therewith, so that the signal 21 is normally held under a spring tension, that turns the same when the rod 13 is projected through the open end of the casing, so as the signal will swing to a position at right angles to the door of the automobile. The upper hinge member 22 is provided with a slot 24, through which a pin 25 secured to the rod projects so as to limit the swinging movement of said signal. Secured to the upper edge of the signal 21 is a flat strip 26, which when the signal is positioned within the door is adapted to form a closure for the slot 5 of the recess within said upper edge.

In operation the automobile signal is normally disposed within the top of the automobile door, as clearly shown in Fig. 1 of the drawing. When it is desired to release the signal when the automobile is about to be turned, the operator grasps the latch 17 by the knob 18, and moves the same outwardly. This will withdraw the projection 19 from the rod 13, and owing to the fact that the rod is under spring tension, the same will be projected upwardly through the open end of the casing, and top of the door. This will move the signal 21 upwardly through the top of said door, and the spring 23 will swing the same outwardly at right angles to the door to the position shown in Fig. 2 of the drawing. This will display the word "Turn", and will obviate the necessity of the operator taking one hand from the steering wheel to signal when the machine is to be turned. To return the signal to normal position it is only necessary to swing the sign 21 back to position over the recess and slot and to force the same downwardly in the top of the door whereupon the recessed portion of the rod 13 will come into alinement with the spring-pressed enlargement 19 of the latch 17, and the parts will once more be in locked position. By positioning this signal in an automobile door, the same is readily accessible to the operator, and may be easily reached when it is desired to release the signal. The signal is normally disposed parallel with the side of the automobile, but when released will automatically swing outwardly at right angles thereto. It is obvious that this signal need not necessarily be disposed in the automobile door, but may be applied to any other easily accessible part of the machine. The construction of the automobile signal herein-described is such that it is applicable to use on various makes of automobiles and may be quickly applied thereto with very little material change to the construction of the same.

From the foregoing description of the construction and operation of my new and improved automobile signal, the manner of applying the same to use and the operation thereof will be readily understood, and it will be seen that I have provided a simple and efficient means for carrying out the objects of this invention. The application of this type of signal to an automobile door does not interfere with the pocket which is disposed on the inner side thereof. Attention is also particularly called to the fact that when the signal is painted white, it is easily visible at night, as when swung into operative position, the rays of the headlight of an approaching car will be reflected thereon, to illustrate the same and render it easily discernible.

Having fully described my invention, what I claim as new, and desire to secure by Letters Patent, is:

1. In a device of the class described the combination with an automobile, of a spring-tensioned slidable and swingable signal carried thereby and normally disposed parallel with one side of the automobile, manually controlled means for releasing said signal and means to automatically swing the same outwardly at right angles to the automobile.

2. In a device of the class described the combination with an automobile, of a vertically slidable spring-tensioned rod normally disposed in one side of the same, a swingable spring tensioned signal pivotally connected with the upper end of said rod, and a latch to release said rod whereby the same is adapted to move upwardly and the signal to swing outwardly at right angles to the side of the automobile.

3. In a device of the class described the combination with an automobile door, of a signal normally disposed in the upper edge thereof, means for releasing the signal and means to automatically swing the same outwardly at right angles to said door.

4. In a device of the class described the combination with an automobile door, of a signal normally disposed in the upper edge thereof, spring means for moving the signal upwardly out of the door, a latch to control said spring means, and means for swinging said signal outwardly at right angles to the door when released therefrom.

5. In a device of the class described the combination with an automobile door having a longitudinally extending recess in its upper edge with a downwardly extending socket at one end, of a spring-tensioned rod slidably mounted in said socket, a latch operable from the inside of said door to normally engage said rod, a spring-pressed signal hingedly connected to the upper end of said rod and normally positioned in the recess, and a closure for said recess on the upper edge of the signal.

6. A device of the class described comprising a casing having a closed end, said casing having a longitudinally extending notch adjacent its open end, a spring-pressed rod slidably mounted in said casing, a latch to normally hold said rod in the casing, a signal hingedly connected with the upper end of said rod and projecting through the notch in said casing and spring means to swing the signal when the same is released from the casing by movement of the rod through said open end.

7. A device of the class described comprising a tubular casing having one end closed, said casing having a longitudinally extending notch adjacent its open end, a spring in the closed end of the casing, a rod slidably mounted in said casing, a latch to normally hold the rod therein against the tension of said spring, a signal hingedly connected with the upper end of the rod and extending through the notch in the casing, means to limit the outward movement of said rod when the latch is released, and spring means to swing said signal outwardly at right angles to the notch when the rod is released.

8. A device of the class described comprising a casing having a closed end, said casing having a longitudinally extending notch adjacent its open end, a spring pressed rod slidably mounted in said casing, a latch to normally hold said rod in the casing, a signal hingedly connected with the upper end of said rod and projecting through the notch in said casing, spring means to swing the signal outwardly when released from the casing by movement of the rod through said open end, and means to limit the outward movement of said signal.

In testimony whereof, I affix my signature hereto.

ROSE L. B. STRUBLE.